United States Patent
Daniels et al.

(10) Patent No.: US 7,787,836 B2
(45) Date of Patent: Aug. 31, 2010

(54) MULTIPLE RADIOS COMMUNICATION DEVICE AND A METHOD THEREOF

(75) Inventors: Melanie Daniels, Folsom, CA (US); Peter D. Mueller, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 841 days.

(21) Appl. No.: 11/716,666

(22) Filed: Mar. 12, 2007

(65) Prior Publication Data

US 2008/0227487 A1    Sep. 18, 2008

(51) Int. Cl.
    *H04B 1/02*    (2006.01)
(52) U.S. Cl. .......................... 455/102; 455/75; 455/78; 455/147; 455/553.1
(58) Field of Classification Search .................. 455/102
    See application file for complete search history.

(56) References Cited

U.S. PATENT DOCUMENTS

2007/0049218 A1*    3/2007    Gorokhov et al. ........... 455/102

FOREIGN PATENT DOCUMENTS

| WO | WO 2004/107590 | 12/2004 |
| WO | WO 2005/059689 | 6/2005 |
| WO | WO 2006/020434 A2 | 2/2006 |
| WO | WO 2006/131669 | 12/2006 |

OTHER PUBLICATIONS

U.S. Appl. No. 11/594,403, filed Nov. 8, 2006, Daniels, Melanie et al.
U.S. Appl. No. 11/699,096, filed Jan. 29, 2007, Mueller, Peter D. et al.
A Mallet et at "Multi-Port Amplifier Operation for Ka-band Space Telecommunication Applications" IEEE 2006 pp. 1518-1521.
International Search Report of PCT/US2008/056288 International Filing date Mar. 7, 2008, Mailing date Jul. 24, 2008.

* cited by examiner

*Primary Examiner*—Duc Nguyen
*Assistant Examiner*—Ajibola Akinyemi
(74) *Attorney, Agent, or Firm*—Pearl Cohen Zedek Latzer, LLP

(57) ABSTRACT

A wireless communication device to transmit and receive signals of two or more wireless networks is disclosed. The wireless communication device includes a first radio to transmit a first type of modulated signals in at least first and second frequency bands and a second radio to transmit a second type of modulated signals in at least third and forth frequency bands. The wireless communication device further includes a first front end module to transmit simultaneously the first and the third frequency bands of the first and second radio through two or more antennas utilizing multiple input multiple (MIMO) output transmission scheme and a second front end module to transmit simultaneously the second and the fourth frequency bands of the first and second radio through two or more antennas utilizing multiple input multiple (MIMO) output transmission scheme.

17 Claims, 4 Drawing Sheets

| Scenario | WiFi 802.11, 2.4GHz | WiFi 802.11, 5.2GHz | WiFi 802.11, 5.8GHz | WiMax, 2.5GHz | WiMax, 2.3GHz | WiMax, 5.2GHz | WiMax, 5.8GHz | WiMax, 3.5GHz |
|---|---|---|---|---|---|---|---|---|
| 1 | 3x3 MIMO | N/A | N/A | SISO or Off | N/A | N/A | N/A | N/A |
| 2 | 3x3 MIMO | N/A | N/A | N/A | SISO or Off | N/A | N/A | N/A |
| 3 | 3x3 MIMO | N/A | N/A | N/A | N/A | 3x3 MIMO | N/A | N/A |
| 4 | 3x3 MIMO | N/A | N/A | N/A | N/A | N/A | 3x3 MIMO | N/A |
| 5 | 3x3 MIMO | N/A | N/A | N/A | N/A | N/A | N/A | 3x3 MIMO |
| 6 | N/A | 3x3 MIMO | N/A | 3x3 MIMO | N/A | N/A | N/A | N/A |
| 7 | N/A | 3x3 MIMO | N/A | N/A | 3x3 MIMO | N/A | N/A | N/A |
| 8 | N/A | 3x3 MIMO | N/A | N/A | N/A | SISO or Off | N/A | N/A |
| 9 | N/A | 3x3 MIMO | N/A | N/A | N/A | N/A | SISO or Off | N/A |
| 10 | N/A | 3x3 MIMO | N/A | N/A | N/A | N/A | N/A | 3x3 MIMO |
| 11 | N/A | N/A | 3x3 MIMO | 3x3 MIMO | N/A | N/A | N/A | N/A |
| 12 | N/A | N/A | 3x3 MIMO | N/A | 3x3 MIMO | N/A | N/A | N/A |
| 13 | N/A | N/A | 3x3 MIMO | N/A | N/A | 3x3 MIMO | N/A | N/A |
| 14 | N/A | N/A | 3x3 MIMO | N/A | N/A | N/A | SISO or Off | N/A |
| 15 | N/A | N/A | 3x3 MIMO | N/A | N/A | N/A | N/A | 3x3 MIMO |
| 16 | 2x2 MIMO | N/A | N/A | 2x2 MIMO | N/A | N/A | N/A | N/A |
| 17 | 2x2 MIMO | N/A | N/A | N/A | 2x2 MIMO | N/A | N/A | N/A |
| 18 | N/A | 2x2 MIMO | N/A | N/A | N/A | 2x2 MIMO | N/A | N/A |
| 19 | N/A | 2x2 MIMO | N/A | N/A | N/A | N/A | 2x2 MIMO | N/A |
| 20 | N/A | N/A | 2x2 MIMO | 3x3 MIMO | N/A | N/A | N/A | N/A |
| 21 | N/A | N/A | 2x2 MIMO | N/A | 3x3 MIMO | N/A | N/A | N/A |
| 22 | SISO or Off | N/A | N/A | N/A | N/A | 3x3 MIMO | N/A | N/A |
| 23 | SISO or Off | N/A | N/A | N/A | N/A | N/A | 3x3 MIMO | N/A |
| 24 | SISO or Off | N/A | N/A | N/A | N/A | N/A | N/A | 3x3 MIMO |
| 25 | SISO or Off | N/A | N/A | 3x3 MIMO | N/A | N/A | N/A | N/A |
| 26 | N/A | SISO or Off | N/A | N/A | 3x3 MIMO | N/A | N/A | N/A |
| 27 | N/A | SISO or Off | N/A | N/A | N/A | 3x3 MIMO | N/A | N/A |
| 28 | N/A | SISO or Off | N/A | N/A | N/A | N/A | 3x3 MIMO | N/A |
| 29 | N/A | SISO or Off | N/A | N/A | N/A | N/A | N/A | 3x3 MIMO |
| 30 | N/A | N/A | SISO or Off | 3x3 MIMO | N/A | N/A | N/A | N/A |
| 31 | N/A | N/A | SISO or Off | N/A | 3x3 MIMO | N/A | N/A | N/A |
| 32 | N/A | N/A | SISO or Off | N/A | N/A | 3x3 MIMO | N/A | N/A |
| 33 | N/A | N/A | SISO or Off | N/A | N/A | N/A | 3x3 MIMO | 3x3 MIMO |

*FIG. 3*

MULTIPLE RADIOS COMMUNICATION DEVICE AND A METHOD THEREOF

BACKGROUND OF THE INVENTION

Wireless communication networks may utilize different medium access schemes. For example, cellular networks utilized cellular access schemes, wireless local area network utilizes IEEE 802.11 standard and metropolitan area network (MAN) utilizes IEEE 802.16 standard. Different radio devices are used for each of these networks and may operate in different frequencies and/or different modulation schemes.

A wireless communication device that is able to operate in different networks may include plurality of separate radios for each wireless network. This wireless communication device may include a large number of internal connections, transmit/receive paths, amplifiers and antennas. Furthermore, the wireless communication device may include a fixed number of antennas and multiple inputs multiple outputs (MIMO) channels for each radio of the wireless communication device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 3 is an exemplary table shows different configurations of signals combinations to be transmitted and/or received with the exemplary wireless communication device of FIG. 2.

Figure 1:
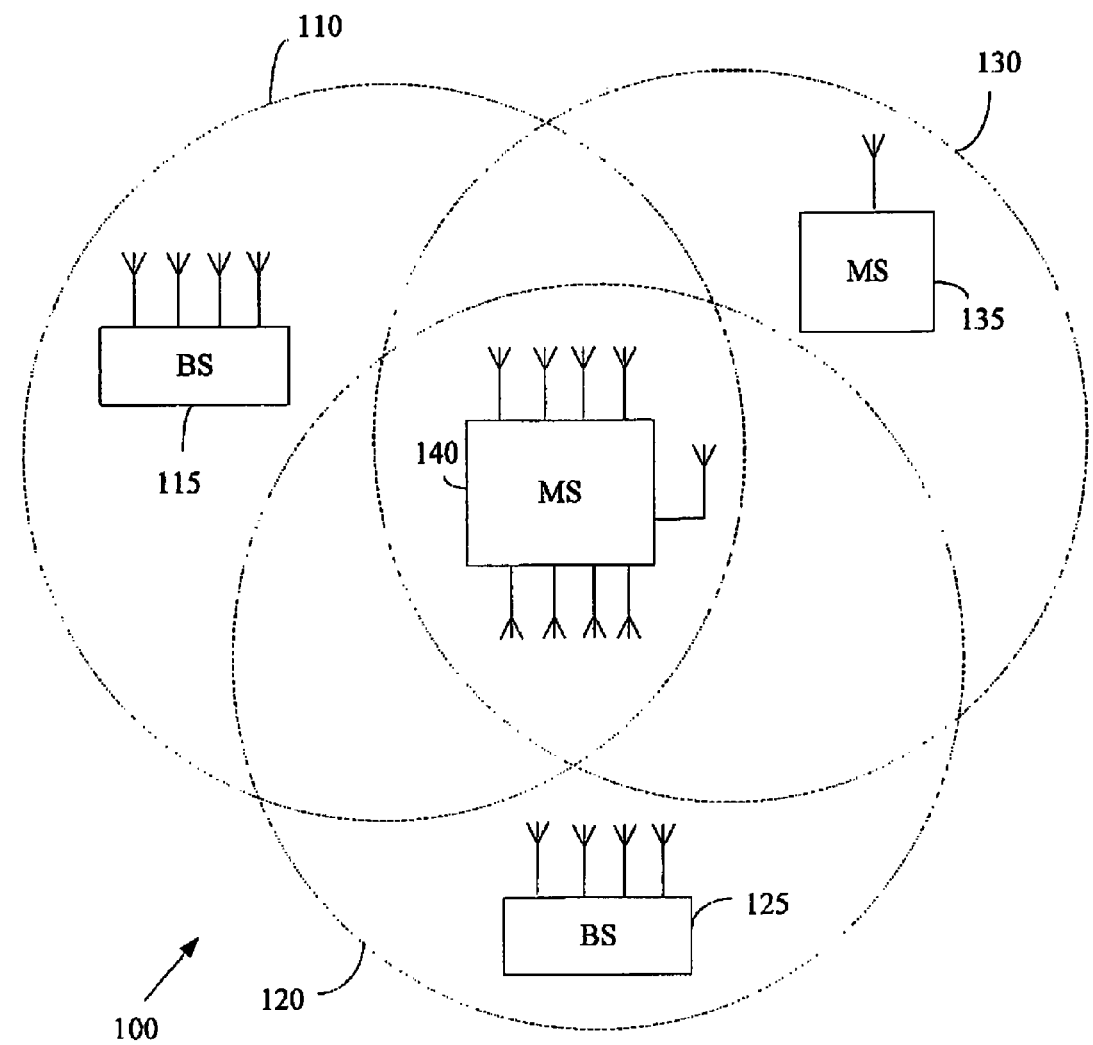
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components, and circuits have not been described in detail so as not to obscure the present invention.

Some portions of the detailed description, which, follow, are presented in terms which related to architecture of a radio transceiver. These terms may be the techniques used by those skilled in the data processing, signal processing arts and radio frequency systems to convey the substance of their work to others skilled in the art.

Unless specifically stated otherwise, as apparent from the following discussions, it is appreciated that throughout the specification discussions utilizing terms such as "plurality" may be used throughout the specification to describe two or more components, devices, elements, parameters and the like. For example, the term "plurality of mobile stations" describes two or more mobile stations.

It should be understood that the present invention may be used in a variety of applications. Although the present invention is not limited in this respect, the circuits and techniques disclosed herein may be used in many apparatuses such as transmitters and/or receivers of a radio system. Transmitters and/or receivers intended to be included within the scope of the present invention may be included, by way of example only, within a wireless local area network (WLAN) also known as WiFi, an ultra wide band radio (UWB), a wireless Metropolitan area network (WMAN) also known as WiMAX, two-way radio communication system, digital communication system, analog communication system transmitters, cellular radiotelephone communication system, LTE cellular communication systems and the like.

Turning first to FIG. 1, a wireless communication network 100 in accordance with an exemplary embodiment of the invention is shown. Although the scope of the present invention is not limited in this respect, wireless communication network 100 may includes a WMAN 110, a WLAN 120, an UWB network 130 and a wireless communication device 140 that includes multi radios, multi band and a MIMO front end module (FEM), if desired.

According to this exemplary wireless communication network 100, WMAN 110 may include at least one base station (BS) 115, WLAN 120 may include at least one BS 125 and UWB network 130 may include at least one mobile station (MS) 135, if desired.

According to one exemplary embodiment of the invention wireless communication device 140 may simultaneously transmit and/or receive signals in different frequency bands to/from BS 115, BS 125 and MS 135 through plurality of antennas. For example, some antennas may transmit signals to BS 125 and 115 and the some other antennas may receive signals from MS 135 and BS 115, if desired.

According to some embodiments of the invention, wireless communication device 140 may include a first radio, for example WMAN radio, to transmit Orthogonal Frequency Division Multiplexing (OFDM) signals in high and low frequency bands to BS 115, a second radio to transmit spread spectrum signals in low and high frequency bands to BS 125 and a third radio to transmit and/or receive UWB signals to/from MS 135, if desired.

Furthermore, wireless communication device 140 may include a first FEM to transmit simultaneously the high and low frequency bands of the WMAN and WLAN radios through two or more antennas utilizing multiple input multiple (MIMO) output transmission scheme and a second FEM to transmit simultaneously other high and low frequency bands of the WMAN and WLAN radios through two or more antennas utilizing MIMO transmission scheme. Wireless communication device 140 may include a switch bank to switch the OFDM and/or the spread spectrum signals from the WMAN and WLAN radios to the first and second FEMs according to the frequency bands of the OFDM and/or spread spectrum signals and a desired transmission scheme of the WMAN and WLAN radios.

Figure 2:
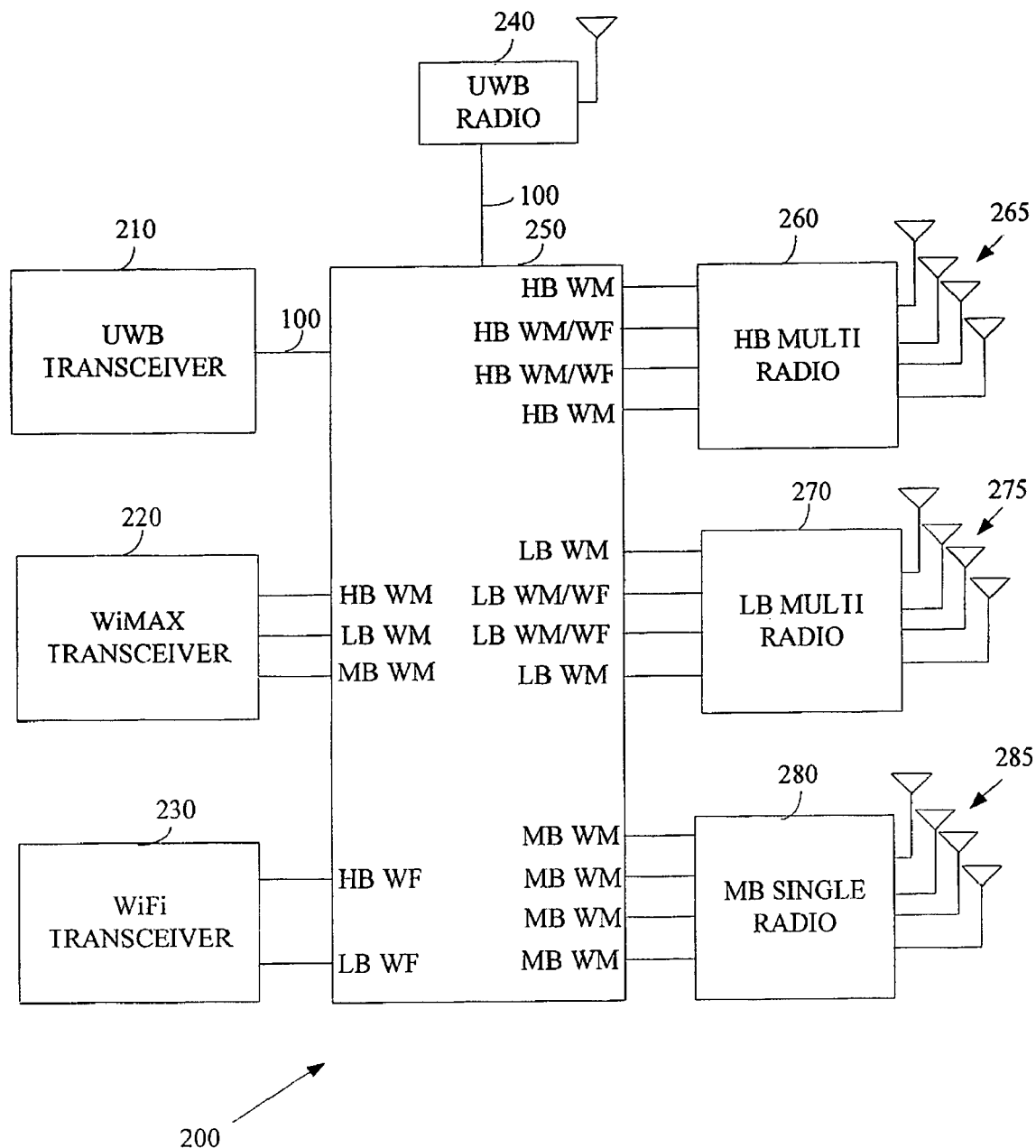
FIG. 2 is a schematic block diagram of a wireless communication device according to some exemplary embodiments of the present invention.

Turning to FIG. 2, a schematic block diagram of a wireless communication device 200 according to some exemplary embodiments of the present invention is shown. Although the scope of the present invention is not limited in this respect wireless communication device 200 may also be termed as multi radios, multi bands, MIMO FEM using multiple ports amplifier (MPA) and includes an UWB transceiver 210, a WiMAX transceiver 220, a WiFi transceiver 230, a multiplexer 250, a high band (HB) multi radio 260, a low band multi (LB) radio 270, a middle band (MB) multi radio 280 and antennas 265, 275 and 285

According to this exemplary embodiment of the invention, UWB transceiver 210 may process and/or modulate/demodulate UWB signals. UWB radio may transmit modulate UWB signals generated by UWB transceiver 210 and/or receives UWB signals that may be demodulated by UWB transceiver 210, if desired. Multiplexer 250 may rout the UWB signals from UWB transceiver 210 to UWB radio 240 and vise versa.

According to some embodiments of the invention, WiMAX transceiver 220 may process and/or modulate/demodulate signals in three different frequency bands according to "IEEE 802.16 LAN/MAN Broadband Wireless LANs" standard. For example, the high frequency band for WiMAX (HB WM) may include 5.2 Giga Hertz (GHz) and 5.8 GHz signals, the middle frequency band for WiMAX (MB WM) may include 3.5 GHz signal and the low frequency band for WiMAX (LB WM) may include 2.3 GHz and 2.5 Hz signals.

According to some embodiments of the invention, WiFi transceiver 230 may process and/or modulate/demodulate signals in two different frequency bands according to "IEEE 802.11 LAN/MAN Broadband Wireless LANs, Part 11: Wireless LAN Medium Access Control (MAC) and Physical Layer (PHY) Specifications" standard. For example, the high frequency band for WiFi (HB WF) may include 5.2 Giga Hertz (GHz) and 5.8 GHz signals, and the low frequency band for WiFi (LB WF) may include 2.4 GHz signal.

Multiplexer 250 may include, but not limited to, mechanical and/or electronic and/or semiconductors and/or Microelectromechanical Systems (MEMS) switches. Multiplexer 250 may route HB WM and HB WF signals from/to WiMAX transceiver 220 and WiFi transceiver 230 to/from HB multi radio 260 and LB multi radio 270, respectively. Furthermore, according to some exemplary embodiments of the invention, multiplexer 250 may route MB WM signals from WiMAX transceiver 220 to MB single radio 270 and vise versa.

According to embodiments of the present invention, HB multi radio 260 and/or LB multi radio 270 may include, a plurality of received signals amplifiers multi Band MIMO and a Front End Module (FEM) that may utilize a Multiple Port Amplifier (MPA) as the transmit amplifier. According to this exemplary embodiment of the invention WiMAX transceiver 220 and WiFi transceiver 230 may include a power control scheme that configured to provide flexible output power to a plurality of MIMO channels of HB multi radio 260 and/or LB multi radio 270, if desired.

In the example shown in this invention, WiMax and WiFi MIMO radios are combined with flexible output powers and number of MIMO channels.

HB multi radio 260, LB multi radio 270 and MB single radio are operably connected to antennas 265, 275 and 285, respectively. For example, antennas 265, 275 and 285 may include an internal antenna, a dipole antenna, a Yagi antenna, a mono pole antenna, an antenna array or the like.

According to some exemplary embodiments of the invention, HB multi radio 260, LB multi radio 270 may transmit and receive simultaneously WiMAX and WiFi signals through each antenna of antennas 265 and 275. For example, HB multi radio 260 may transmit and/or receive simultaneously HB WF signals through two antennas and HB WM signals through other two antennas, if desired. LB multi radio 270 may transmit and/or receive simultaneously LB WF signals through two antennas and LB WM signals through other two antennas, if desired.

Turning to FIG. 3 an illustration of an exemplary table 300 shows different configurations of signals combinations to be transmitted and/or received with the exemplary wireless communication device 200 of FIG. 2. It should be understood that table 300 is an example only, and many others combinations of WiMAX and WiFi signals are possible. In order to reduce the number of antennas, a subset of the configuration shown by table 300 may be used. Wideband techniques may also be used to further combine signals of UWB transceiver 210, WiMAX transceiver 220 and WiFi transceiver 230 to reduce the number of signal paths and antennas.

Figure 4:
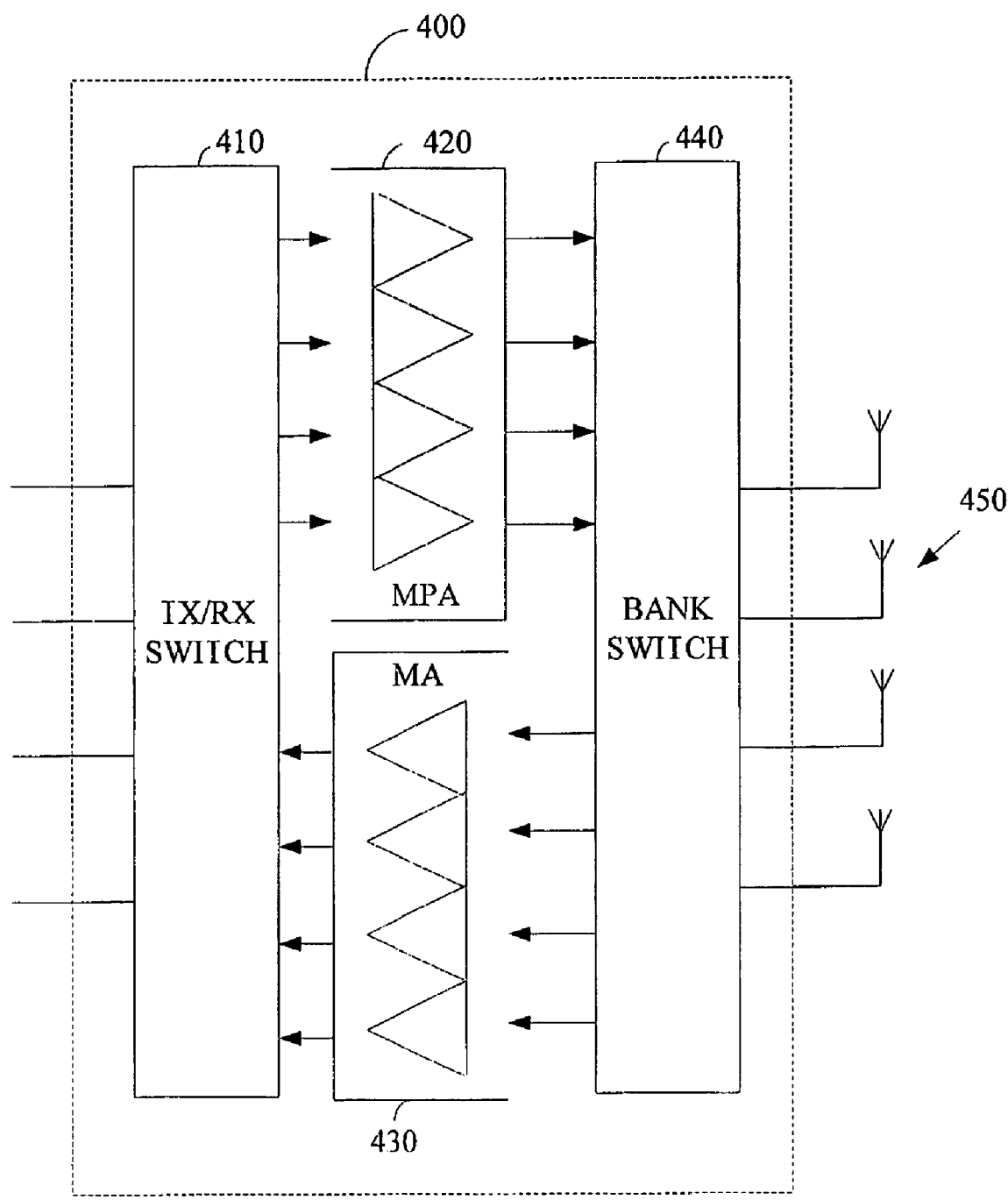
FIG. 4 is a schematic block diagram of a radio front end module (FEM) according to some exemplary embodiments of the invention.

Turning to FIG. 4 is a schematic block diagram of a radio front end module (FEM) 400 according to some exemplary embodiments of the invention is shown. Although the scope of the present invention is not limited in this respect, FEM 400 may include a transmit/receive switch 410 to switch between received signals to modulated signals intended to be transmit by a multiple port amplifier (MPA) 420, a multiple amplifier (MA) 430 to amplify the received signals, a switch bank 440 to switch the modulated signals to be transmitted by antennas 450 and/or to connect antennas 450 to MA 430 to provide the received signals to receivers, if desired.

According to this exemplary embodiment of the invention, MPA 420 may include four passive hybrid splitters in a Butler Matrix formation, four power amplifiers, and four passive hybrid combiner in a Butler matrix formation, although it should be understood that the scope of the present is not limited in this respect.

MPA 420 may utilize as a transmit amplifiers able to transmit signals according to a beam forming scheme. For example, a beam forming scheme may utilize a Butler beamforming matrix, which needs only N×logN elements for beam forming. The Butler matrix uses 90° phase-lag hybrid junctions with 45° fixed-phase shifters. Butler networks for a four-element array with the elemental spacing of λ\2 produces four beams which are over lap and mutually orthogonal.

According to embodiments of the invention, the signal at each of the foul input ports of MPA 420 are divided evenly at different phases and distributed substantially equal to each power amplifier (PA). The signals may recombine in an output Butler Matrix and emerge as original discrete signals on the four output ports. According to this configuration a "multiple signal" in each PA may include a ¼ of each input signal evenly distributed in each PA. This allows MPA 420 to have a "flexible power" for each MIMO channel of FEM 400 and to combine signals of different radios. For example, signals of WiMax and/or WiFi MIMO adios may be combined with flexible output powers and number of MIMO channels, if desired.

Although the scope of the present invention is not limited in this respect, an input switch matrix, an output switch and a filter matrix may be used to complete the transmit and receive functions for FEM 400. In some other embodiments of the invention, the input switch matrix and input Butler Matrix may be implemented at base band of a combined radio and/or a software defined radio (SDR), if desired.

According to this example, FEM 400 operates in a frequency band where multiple MIMO radios will be used. For example, a lower band (2.2 GHz to 2.7 GHz), an U-NII band (5.15 GHz to 5.85 GHz) and/or any other commercial radio frequency band where band frequencies are close or overlap.

The table below demonstrates FEM 400 operation according to several scenarios of combinations of different radios and different frequency bands in different modes of operation.

| Scenario | Radio 1, Band 1 | Radio 2, Band 2 | Radio 2, Band 3 |
|---|---|---|---|
| 1 | 3 × 3 MIMO | SISO or Off | N/A |
| 2 | 3 × 3 MIMO | N/A | SISO or Off |
| 3 | 2 × 2 MIMO | 2 × 2 MIMO | N/A |
| 4 | 2 × 2 MIMO | N/A | 2 × 2 MIMO |
| 5 | SISO or Off | 3 × 3 MIMO | N/A |
| 6 | SISO or Off | N/A | 3 × 3 MIMO |
| 7 | SISO or Off | N/A | 3 × 3 MIMO |

While certain features of the invention have been illustrated and described herein, many modifications, substitutions, changes, and equivalents will now occur to those skilled in the art. It is, therefore, to be understood that the appended claims are intended to covet all such modifications and changes as fall within the true spirit of the invention.

What is claimed is:

1. A wireless communication device comprising:
   a first radio to transmit a first type of modulated signals in at least first and second frequency bands;
   a second radio to transmit a second type of modulated signals in at least third and forth frequency bands;
   a first front end module to transmit simultaneously the first and the third frequency bands of the first and second radio through two or more antennas utilizing multiple input multiple (MIMO) output transmission scheme;
   a second front end module to transmit simultaneously the second and the fourth frequency bands of the first and second radio through two or more antennas utilizing multiple input multiple (MIMO) output transmission scheme; and
   a switch bank to switch two or more signals from the first and second radios to the first and second front end modules according to frequency bands of the two or more signals and a desired transmission scheme of the first and second radios.

2. The wireless communication device of claim 1, wherein the first and second front end modules comprise first and second multiple port amplifiers.

3. The wireless communication device of claim 2, wherein the first or second multiple port amplifiers capable of simultaneously transmitting different frequency bands of the first and second radio through two or more antennas utilizing multiple input multiple (MIMO) output transmission scheme.

4. The wireless communication device of claim 2, wherein the first or second multiple port amplifiers comprise:
   four or more passive hybrid splitters arranged in a Butler matrix formation;
   four or more power amplifiers; and
   four or more passive hybrid combiners arranged in a Butler matrix formation.

5. The wireless communication device of claim 1, wherein the switch bank routes two or more signals from the first and second radios to the first and second front end modules according to a frequency band of the two or more signals.

6. The wireless communication device of claim 1, wherein the first front end module transmits signals in a high frequency band and the second front end module transmits signals in a low frequency band.

7. The wireless communication device of claim 1, comprises:
   a third front end module to transmit signals in middle frequency band.

8. The wireless communication device of claim 1, wherein the first radio operates in a metropolitan wireless network and the second radio operates in a wireless local area network.

9. The wireless communication device of claim 1, comprises:
   a third radio to transmit ultra wideband signals.

10. A wireless communication network comprising:
    at least a first and second wireless communications networks and an at least one wireless communication device to simultaneously transmit and receive signals from the first and second wireless communications networks wherein, the wireless communication device comprises:
    a first radio to transmit a first type of modulated signals in at least first and second frequency bands;
    a second radio to transmit a second type of modulated signals in at least third and forth frequency bands;
    a first front end module to transmit simultaneously the first and the third frequency bands of the first and second radio through two or more antennas utilizing multiple input multiple (MIMO) output transmission scheme;
    a second front end module to transmit simultaneously the second and the fourth frequency bands of the first and second radio through two or more antennas utilizing multiple input multiple (MIMO) output transmission scheme; and
    a switch bank to switch two or more signals from the first and second radios to the first and second front end modules according to frequency bands of the two or more signals and a desired transmission scheme of the first and second radios.

11. The wireless communication network of claim 10, wherein the wireless communication device comprises:
    the first and second front end modules comprise first and second multiple port amplifiers.

12. The wireless communication network of claim 11, wherein the first or second multiple port amplifiers of the wireless communication device are capable of simultaneously transmitting different frequency bands of the first and second radio through two or more antennas utilizing multiple input multiple (MIMO) output transmission scheme.

13. The wireless communication network of claim 11, wherein the first or second multiple port amplifiers of the wireless communication device comprise:
    four or more passive hybrid splitters arranged in a Butler matrix formation;
    four or more power amplifiers; and
    four or more passive hybrid combiners arranged in a Butler matrix formation.

14. The wireless communication network of claim 10, wherein the switch bank of the wireless communication device is able to route two or more signals from the first and second radios to the first and second front end modules according to a frequency band of the two or more signals.

15. The wireless communication network of claim 10, wherein the first front end module of the wireless communication device transmits signals in a high frequency band and the second front end module transmits signals in a low frequency band.

16. The wireless communication network of claim 10, wherein the wireless communication device comprises:
    a third front end module to transmit signals in middle frequency band.

17. The wireless communication network of claim 10, wherein the wireless communication device comprises:
    a third radio to transmit ultra wideband signals.

* * * * *